United States Patent [19]
Penny

[11] Patent Number: 5,971,024
[45] Date of Patent: Oct. 26, 1999

[54] METHOD AND APPARATUS FOR CONTROLLING FLUID FLOW

[76] Inventor: William H. Penny, 4457 Arden View Ct., Arden Hills, Minn. 55112-1944

[21] Appl. No.: 09/234,436

[22] Filed: Jan. 20, 1999

[51] Int. Cl.[6] ............................. F16K 15/14; F16K 15/00
[52] U.S. Cl. ..................... 137/859; 137/852; 137/512.15
[58] Field of Search ................... 137/859, 852, 137/512.15

[56] References Cited

U.S. PATENT DOCUMENTS

| | | | |
|---|---|---|---|
| 465,013 | 12/1891 | Bourdil | 137/859 |
| 2,168,396 | 8/1939 | Davis | 221/47.5 |
| 2,775,988 | 1/1957 | Hamner | 141/305 |
| 2,942,614 | 6/1960 | Lardner | 137/859 |
| 3,037,522 | 6/1962 | Millan | 137/512.15 |
| 3,385,301 | 5/1968 | Harautuneian | 128/349 |
| 3,465,786 | 9/1969 | Spisak | 137/859 |
| 4,089,506 | 5/1978 | Blake | 251/196 |
| 4,111,231 | 9/1978 | Leppich | 137/852 |
| 4,217,921 | 8/1980 | Gidner | 137/512.15 |
| 4,246,932 | 1/1981 | Raines | 137/512 |
| 4,296,785 | 10/1981 | Vitello et al. | 141/105 |
| 4,357,959 | 11/1982 | Shetler | 137/512.15 |
| 4,373,560 | 2/1983 | Elsworth | 141/129 |
| 4,375,825 | 3/1983 | Greenspan | 137/852 |
| 4,470,431 | 9/1984 | Shackelford | 137/625.11 |
| 4,622,400 | 11/1986 | Hammond | 546/179 |
| 4,648,868 | 3/1987 | Hardwick et al. | 604/32 |
| 4,729,401 | 3/1988 | Raines | 137/512 |
| 4,775,301 | 10/1988 | Cartwright et al. | 137/859 |
| 4,833,329 | 5/1989 | Quint et al. | 250/432 |
| 4,852,605 | 8/1989 | Gouhier | 137/859 |
| 4,893,644 | 1/1990 | Giacomini | 137/512.15 |
| 4,905,744 | 3/1990 | Siegrest et al. | 141/258 |
| 4,913,202 | 4/1990 | Miller et al. | 141/258 |
| 5,064,168 | 11/1991 | Raines et al. | 251/322 |
| 5,074,839 | 12/1991 | Choksi et al. | 604/4 |
| 5,076,322 | 12/1991 | Choksi et al. | 137/505.13 |
| 5,165,578 | 11/1992 | Laible | 137/859 |
| 5,207,638 | 5/1993 | Choksi et al. | 604/4 |
| 5,215,538 | 6/1993 | Larkin | 137/859 |
| 5,228,646 | 7/1993 | Raines | 251/95 |
| 5,660,205 | 8/1997 | Epstein | 137/512.15 |

*Primary Examiner*—Denise L. Ferensic
*Assistant Examiner*—Joanne Y. Kim
*Attorney, Agent, or Firm*—Kinney & Lange, P.A.

[57] ABSTRACT

A check valve for controlling flow between a low-pressure reservoir and a source reservoir has a pin and an associated diaphragm. The pin has a shaft portion which is attached adjacent to the low-pressure reservoir and a closed head portion. The shaft of the pin has a central channel which opens into the low-pressure reservoir and is connected to the outer surface of the pin by at least one opening in the pin. The diaphragm is made of an elastomeric material and is disposed to tightly fit around, and bias against the surface of the pin. The diaphragm seals around the opening in the pin and is elastically deformable by a predetermined positive pressure to define a pathway from the high-pressure source into the opening in the pin and ultimately into the low-pressure reservoir.

23 Claims, 6 Drawing Sheets

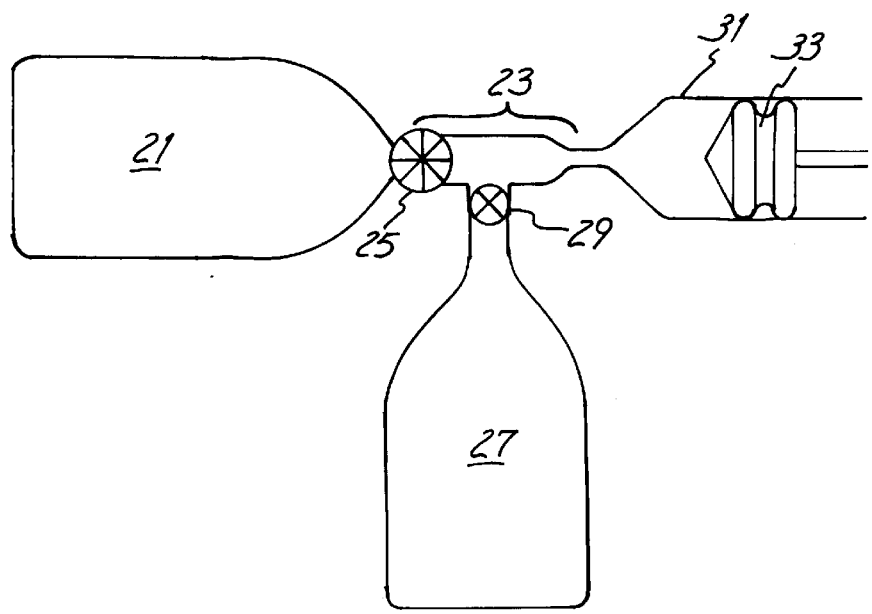
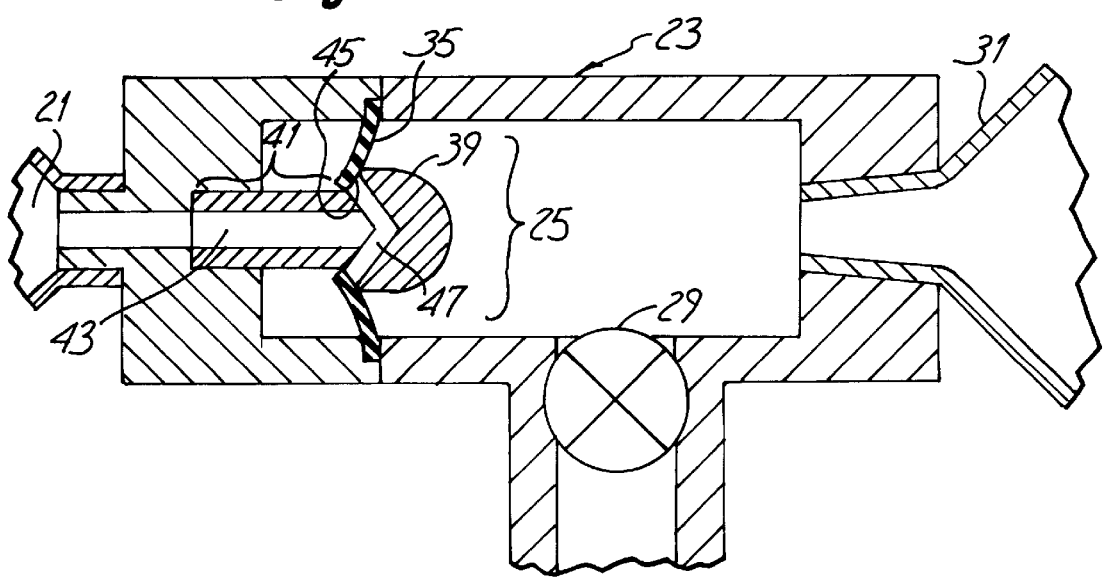

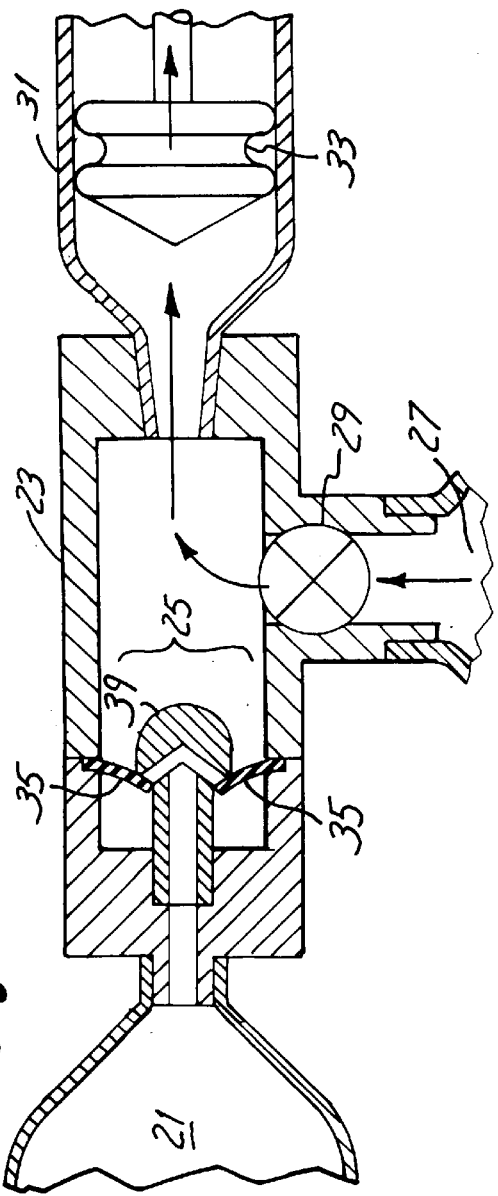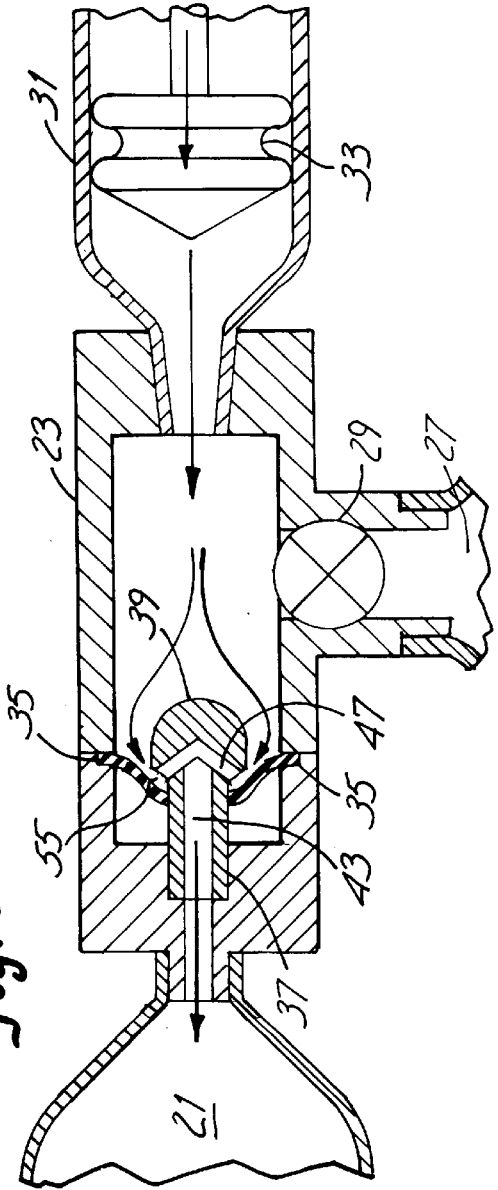

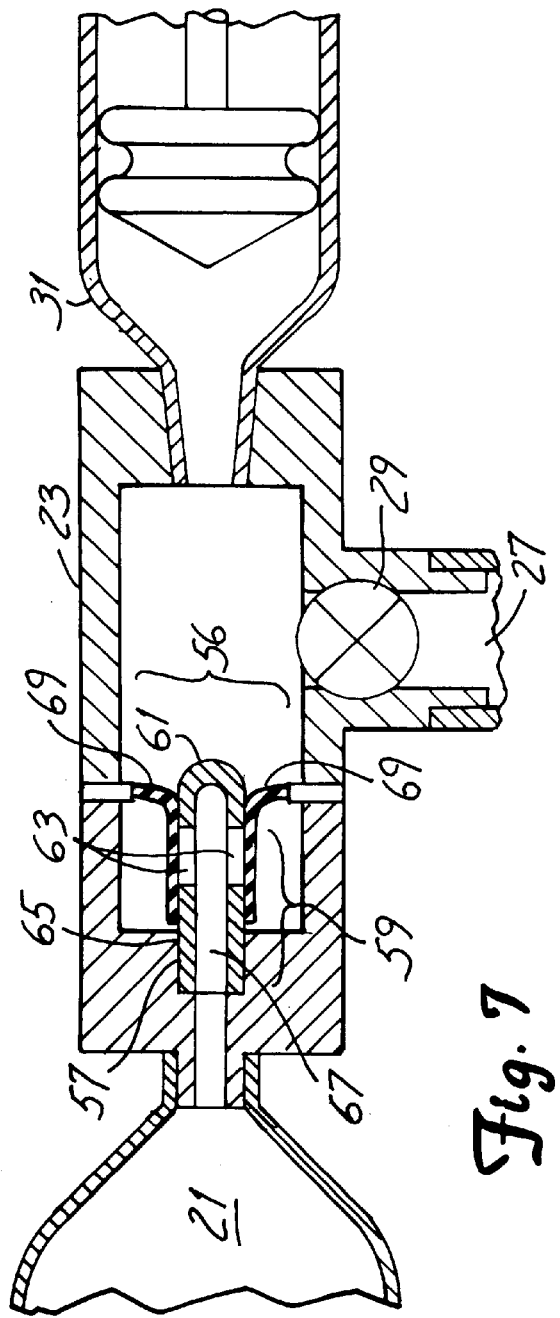
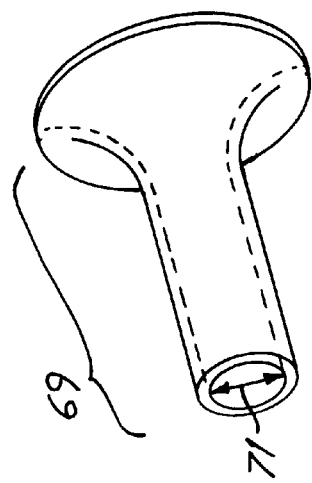

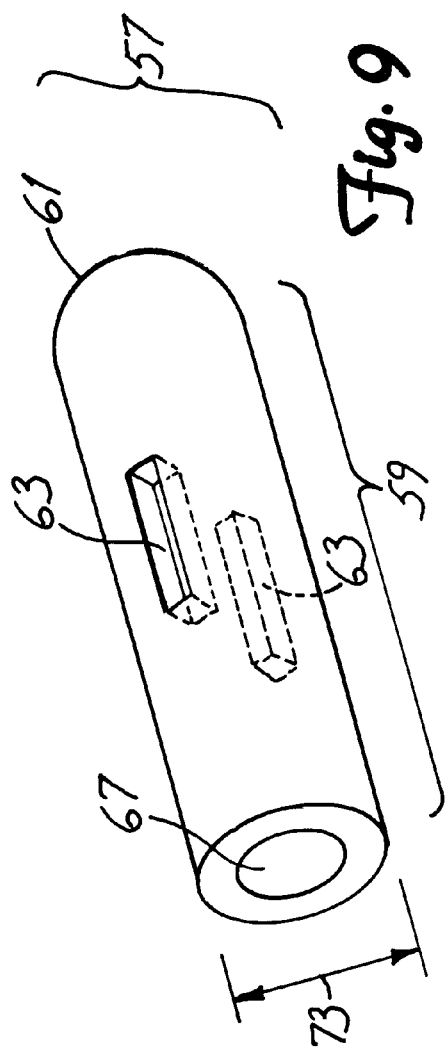
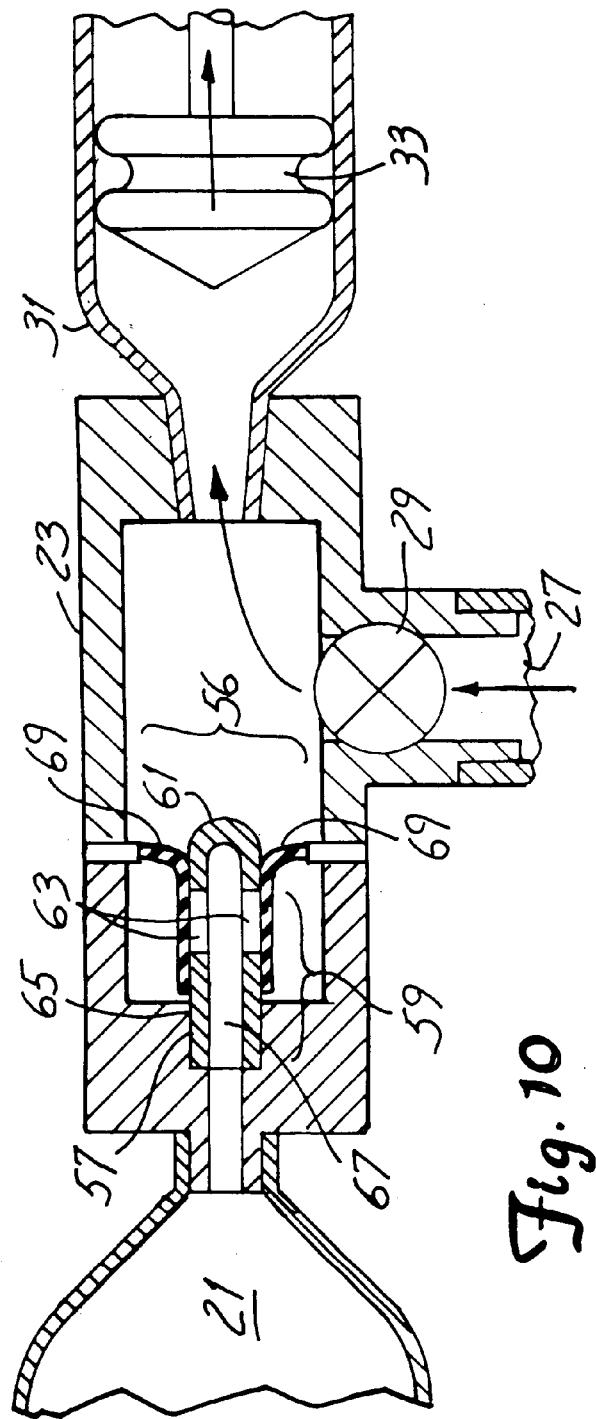

METHOD AND APPARATUS FOR CONTROLLING FLUID FLOW

BACKGROUND OF THE INVENTION

The present invention relates to an apparatus and method for controlling the transfer of a fluid from a first container to a second container. Specifically, the present invention relates to a check valve used to control the transfer of fluid from a first container to a second container that has a sub-atmospheric pressure. One application of the present invention is the subdivision of pharmaceutical solutions where a pipetting device is used to transfer a liquid solution into an evacuated container containing a lyophilized drug.

Valve and pump systems for regulating fluid flow are generally known in the art. The prior art shows the use of rotary valves or pinching mechanisms to selectively direct fluid flow. For example, a rotary valve may be manipulated by an air cylinder or other mechanical means to selectively open and close particular fluid flow pathways. Fluid pathways may be pinched-off mechanically by a hinge plate or a cam lobe that presses a fluid containing tube shut to prevent fluid flow. The prior art also teaches the use of pumps and pressure differentials to control fluid flow through a valve system.

In addition, conventional one-way valves are generally known in the art. Conventional one-way valves are configured so a poppet is held against a seat by mechanical means, such as a spring. A conventional one-way valve operates to open only when pressure against the poppet is sufficient to overcome the mechanical means holding the poppet against the seat. The mechanical means of a conventional one-way valve exerts force in a direction opposite the driving force of the pressure gradient across the one-way valve in order to control flow from a high-pressure container into a low-pressure container. The mechanical means in a conventional one-way valve acts against the pressure gradient to keep the poppet in place and prevent uncontrolled flow into the low pressure container. As the pressure gradient between the two containers increases, the mechanical means must exert more and more force against the poppet to keep the poppet seated and the valve sealed.

As the pressure gradient increases, a conventional one-way valve also becomes more prone to "cracking." Cracking occurs when the mechanical means fails to keep the poppet seated because of the large pressure gradient across the one-way valve. When cracking occurs fluid flows through the valve and into the low-pressure container until the pressure difference between the two containers has diminished enough to allow the crack in the valve to reseal. As a result, conventional one-way valves are less reliable when used in applications where precise amounts of fluid must be transferred from a container at ambient pressure to a low-pressure container.

BRIEF SUMMARY OF THE INVENTION

The present invention is a simple check valve that is not prone to cracking and allows for the controlled transfer of fluid from a first, source reservoir to a second reservoir, even when the second reservoir is evacuated. The check valve of the present invention operates reliably even when the second reservoir is evacuated. The check valve of the present invention comprises a pin fitted within an elastomeric diaphragm. The pin has a shaft portion and a head portion. The shaft portion of the pin has a central channel that opens into a low-pressure reservoir. The pin has an outer surface in which at least one opening is disposed. The opening in the outer surface of the pin connects the outer surface of the pin to the central channel. The diaphragm is configured to tightly fit and bias against the outer surface of the pin and seal the opening. When positive pressure is applied to the head portion of the pin, the diaphragm elastically deforms to define a pathway into the opening in the surface of the outer pin, through the central channel in the pin, and ultimately into the second reservoir. Unlike conventional check valves, both the pressure differential and the mechanical bias of the diaphragm against the pin act in concert to hold the valve closed and prevent uncontrolled cracking of the seal.

In one embodiment, the pin is configured to have a head portion that is wider than the shaft portion of the pin. The enlarged head portion of the pin tapers toward the adjacent shaft portion of the pin. The opening in the surface of the pin is disposed in the taper of the closed head portion of the pin. The diaphragm has an annular shape that defines an inner diameter approximately equal to the outer diameter of the shaft portion. The diaphragm tightly fits the shaft portion of the pin and biases against the wider head portion of the pin to seal around the opening in the tapered surface of the head portion of the pin.

In another embodiment, the pin has a tubular shape. The at least one opening in the surface of the pin is disposed in the shaft portion of the pin. The elastomeric diaphragm also has a substantially tubular shape. The tubular diaphragm has a bend at one end where the diaphragm is secured. The elastomeric diaphragm is configured to tightly fit over and bias against the outer surface of the tubular shaft, and seal against the opening in the shaft of the pin. When positive pressure is applied to the closed head portion of the pin, the elastomeric diaphragm deforms to define a pathway into the at least one opening in the surface of the shaft of the pin, through the connected central channel, and ultimately into the second reservoir.

Both the mechanical bias and the pressure differential act to keep the check valve of the present invention sealed. In this way, the present invention provides for a simple two-component check valve which will operate across a large pressure differential without cracking. As a result, the check valve of the present invention allows for a consistent, controlled transfer of fluid from a first reservoir into a second low-pressure, or evacuated reservoir.

BRIEF DESCRIPTION OF THE DRAWINGS

The present invention will be further explained with reference to the drawing figures listed below wherein like structure is referred to by like numerals throughout the several views.

FIG. 1 is a schematic view of the fluid transfer system utilizing the present invention.

FIG. 2 is a sectional view of a first preferred embodiment of the check valve of the present invention in use in a fluid transfer system.

FIG. 5 is a sectional view of the first embodiment of the check valve of the present invention during the filling of a metering pump.

FIG. 6 is a sectional view of the first embodiment of the check valve of the present invention when positive pressure is applied to the closed head of the check valve.

FIG. 7 is a sectional view of a second embodiment of the check valve of the present invention in use in a fluid transfer system.

FIG. 8 is a perspective view of the diaphragm of the embodiment shown in FIG. 7.

FIG. 9 is a perspective view of the pin of the embodiment shown in FIG. 7.

FIG. 10 is a sectional view of the check valve of the present invention during the filling of a metering pump.

Figure 3:
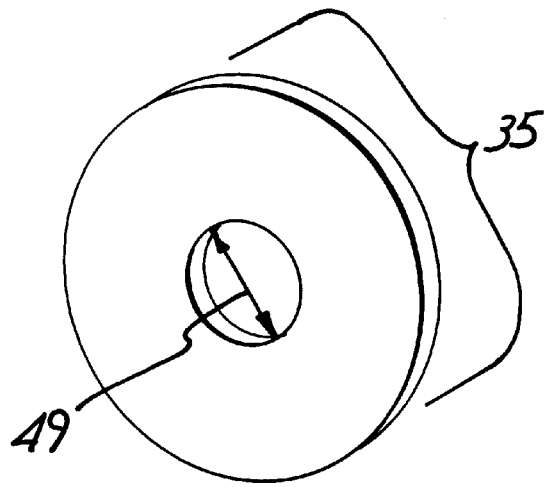
FIG. 3 is a perspective view of the diaphragm for the embodiment shown in FIG. 2.

While the above-identified drawings feature several preferred embodiments, other embodiments of the present invention are also contemplated, as noted in the discussion. This disclosure presents illustrative embodiments of the present invention. Numerous other modifications and embodiments can be devised by those skilled in the art which fall within the scope and spirit of the principles of this invention.

DETAILED DESCRIPTION

FIG. 1 shows a schematic of a fluid transfer system utilizing the present invention. Low-pressure reservoir 21 is connected to housing 23. Between low-pressure reservoir 21 and housing 23 is check valve 25 of the present invention. Also connected to housing 23 is source reservoir 27. Between housing 23 and source reservoir 27 is conventional one-way valve 29. Opposite low-pressure reservoir 21 is metering pump 31 that has piston 33. As piston 33 is drawn in a direction away from the housing 23, pressure in housing 23 decreases allowing conventional check valve 29 to open, and fluid to flow from source reservoir 27 into housing 23 and into metering pump 31. While metering pump 31 is being filled, check valve 25 of the present invention remains sealed between low-pressure reservoir 21 and housing 23. A controlled amount of fluid is transferred from metering pump 31 into low-pressure reservoir 21 when piston 33 is pushed toward housing 23 to create a high fluid pressure in housing 23 adjacent to check valve 25, causing check valve 25 to open and allow fluid to enter low-pressure reservoir 21. Meanwhile, conventional one-way valve 29 remains sealed so that no fluid is transferred from metering pump 31 to source reservoir 27. In this way, the present invention allows for precise and controlled transfer of a fluid from source reservoir 27 to low-pressure reservoir 21.

One embodiment of the present invention is shown in more detail in FIGS. 2–6. Check valve 25 includes an elastomeric diaphragm 35 which tightly fits around, and biases against pin 37. In this embodiment of the present invention, pin 37 has an enlarged closed head portion 39 and shaft portion 41. Pin 25 has a central channel 43 which opens into low-pressure reservoir 21. Central channel 43 is connected to outer surface 45 of pin 25 by one or more openings 47. Elastomeric diaphragm 35 biases against enlarged closed head 39 to seal openings 47. Enlarged closed head portion 39 is positioned entirely within housing 23. Metering pump 31 and source reservoir 27 with conventional one-way valve 29 are also connected to housing 23.

A perspective view of the diaphragm 35 is shown in FIG. 3. Diaphragm 35 is preferably formed of an elastomeric material such as silicone. In a preferred embodiment diaphragm 35 has an annular shape defining inner diameter 49. Annular diaphragm 35 is secured so that pin 37 fits through inner diameter 49 and diaphragm 35 biases against the enlarged head portion 39 of pin 37.

Figure 4:
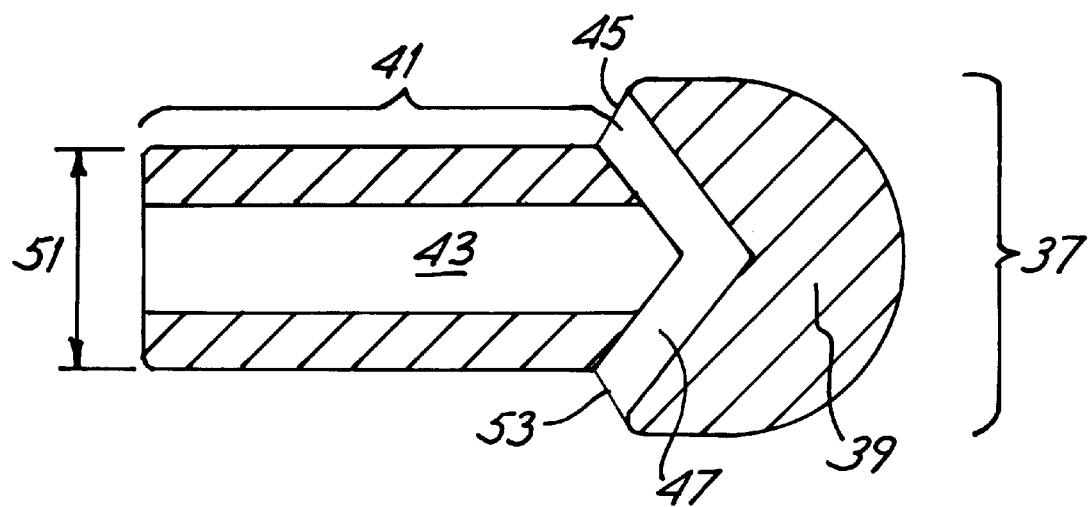
FIG. 4 is an enlarged sectional view of the first embodiment of the pin of the present invention.

An enlarged view of pin 37 is shown in FIG. 4. The shaft portion 41 of pin 37 has outer diameter 51 which is approximately equal to inner diameter 36 of annular diaphragm 35 so that the annular diaphragm tightly fits over shaft portion 41 of pin 37. Enlarged closed head portion 39 has taper 53 adjacent shaft 41. Openings 47 are situated in taper 53 so that diaphragm 35 optimally seals over openings 47. Central channel 43 and pin 37 are connected to outer surface 45 of pin 37 by openings 47 in enlarged closed head portion 39 of pin. In this embodiment, diaphragm 35 biases against enlarged closed head portion 39 and seals against openings 47 in pin 37.

Check valve 25 of the present invention is shown in use in FIG. 5. As piston 33 in metering pump 31 is drawn back, pressure within housing 23 decreases, which allows conventional one-way valve 29 to open so that fluid from source reservoir 27 can flow into housing 23, and ultimately into metering pump 31. While piston 33 is being drawn back, low-pressure reservoir is sealed off by check valve 25 of the present invention. Diaphragm 35 is held tightly against enlarged closed head portion 39 of pin 37 by both the pressure difference between the pressure in housing 23 and the pressure in low-pressure reservoir 21 and the diaphragm's bias against the enlarged head portion 39.

Next, as shown in FIG. 6, metering pump 31 fills low-pressure reservoir 21 with fluid drawn from source reservoir 27 as piston 33 is pushed toward housing 23 to create high-pressure within housing 23. The high-pressure in housing 23 causes conventional one-way valve 29 to seal. As the metering pump increases pressure within housing 23, the pressure adjacent to enlarged closed head portion 39 of pin 37 increases until diaphragm 35 elastically deforms to allow pathway 55 into opening 47 in pin 37, through central channel 43, and ultimately into low-pressure reservoir 21. In this way, the fluid is transferred in a precise and controlled manner from source reservoir 27 to low-pressure reservoir 21.

Another embodiment of the present invention is shown in FIGS. 7–11. Housing 23, low-pressure reservoir 21, source reservoir 27 with conventional one-way check valve 29, and metering pump 31 are configured in the same manner as explained in FIGS. 2, 5 and 6. This second embodiment of the present invention has check valve 56 having pin 57 with shaft portion 59 and closed head portion 61. Pin 57 has a substantially tubular shape and head portion 61 is not enlarged with respect to shaft portion 59. One or more openings 63 in outer surface 65 of pin 57 are disposed in shaft portion 59 of pin 57. Openings 63 connect outer surface 65 to center channel 67 which opens into low-pressure reservoir 21. Diaphragm 69 is preferably formed from an elastomeric material such as silicone, and tightly fits over, and biases against, pin 57 to seal over openings 63 which connect outer surface 65 to central channel 43.

A perspective view of the second embodiment of diaphragm 69 is shown in FIG. 8. Diaphragm 69 has a substantially tubular shape which defines an inner diameter 71. Diaphragm 69 is bent outward from one end to provide for attachment to housing 23 and to allow diaphragm 69 to bias against pin 57.

A perspective view of pin 57 is shown in FIG. 9. In this embodiment openings 63 are in shaft portion 59 of pin 57. Closed head portion 61 is not enlarged with respect to shaft portion 59. Central channel 67 is positioned to be adjacent to low-pressure reservoir 21. Shaft portion 59 has outer diameter 73 that is approximately equal to inner diameter 71 of elastomeric diaphragm 69 so that diaphragm tightly fits over, and biases against, pin 37.

FIG. 10 shows the second embodiment of the present invention when metering pump 31 is being filled. Piston 33 is drawn back within metering pump 31 which lowers the pressure in housing 23 causing conventional one-way valve 29 to open and allow fluid from source reservoir 27 to enter housing 23 and metering pump 31. As metering pump 31 is being filled, check valve 56 remains closed. Because diaphragm 69 biases against pin 57 and the pressure in low-pressure reservoir 21 is lower than the pressure in the housing 23, diaphragm remains tightly sealed against pin 57 and openings 63 which connect outer surface 65 of pin 57 through central channel 67 to low-pressure reservoir 21.

Figure 11:
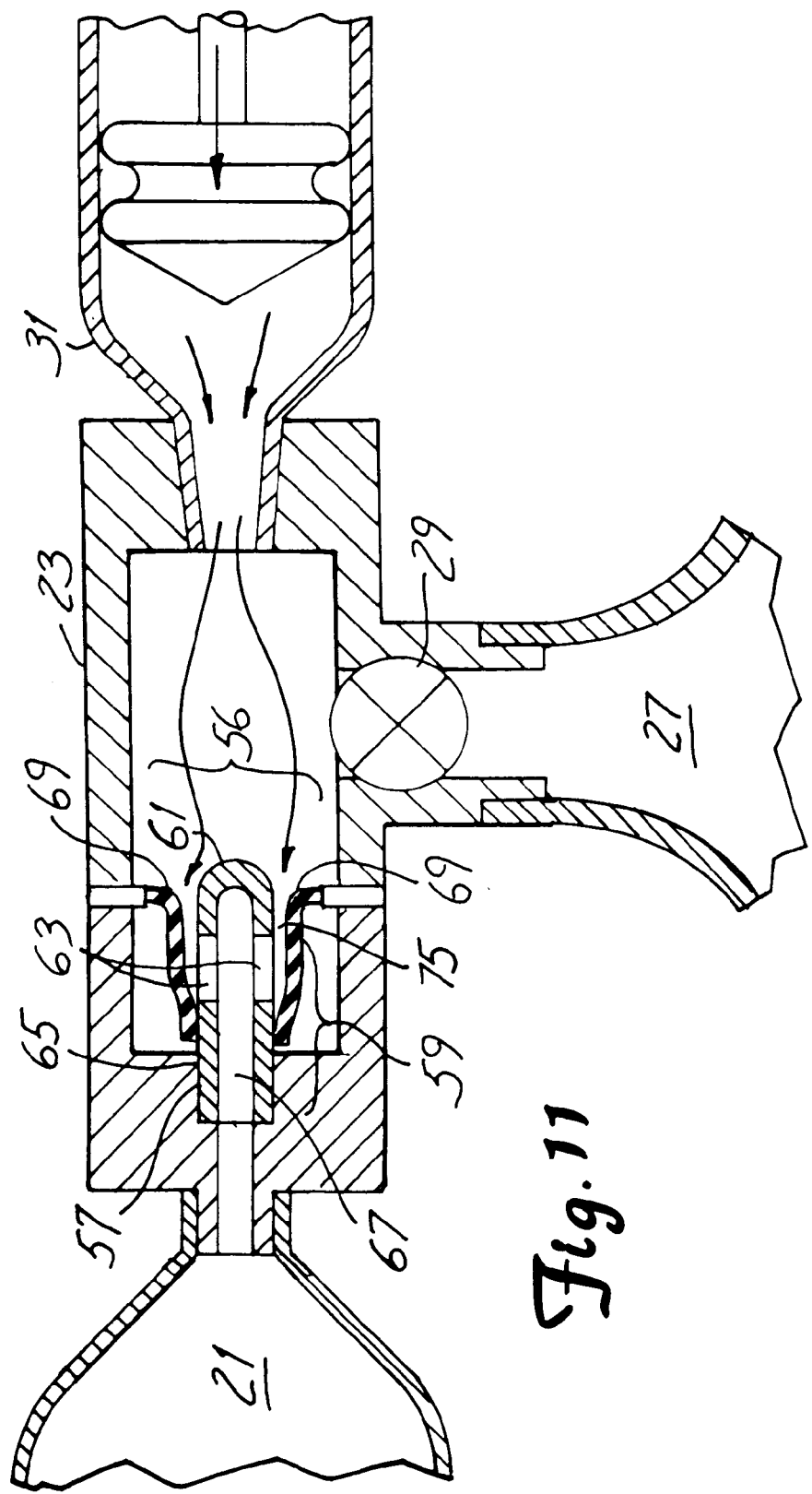
FIG. 11 is a sectional view of the second embodiment of the check valve of the present invention when positive pressure is applied to the closed end of the check valve.

FIG. 11 shows check valve 25 when metering pump 31 is used to deliver controlled amounts of fluid from metering pump 31 to low-pressure reservoir 21. As piston 33 is pushed toward housing 23, the fluid pressure within housing 23 increases which seals one-way valve 29 and increases the fluid pressure at closed head portion 61 of pin 57. The increased pressure adjacent closed head portion 61 and pin 57 deforms elastomeric diaphragm 69 to define pathway 75 to openings 63 and outer surface 65 and pin 57. Pathway 75 allows fluid to flow from metering pump 31 into openings 63, through central channel 67 and into low-pressure reservoir 21.

While the diaphragms are formed from elastomeric materials, other check valve components are preferably formed from polymer components that can be assembled via adhesives, ultrasound or other suitable leak-tight methods.

Although only two embodiments are illustrated, the invention is not limited to those structures in the application. According to the invention check valve seals against one or more openings with both the mechanical pressure resulting from elastomeric diaphragm being biased against pin and the pressure difference across the check valve. As a result, the inventive check valve is less likely to crack when used in a valve system with large pressure differences across check valve. The present invention thus provides a simple two-component check valve that can be used to precisely control the transfer of a fluid from a source reservoir to a low-pressure reservoir. In addition, the present invention provides a means for reliable, controlled metering of a fluid from a first container that is at atmospheric pressure, into a second container that is at sub-atmospheric pressure.

Although the check valve of the present invention has been described with reference to preferred embodiments, workers skilled in the art will recognize that changes may be made in form and detail without departing from the spirit and scope of the invention.

I claim:

1. A check valve for controlling flow between a first, source fluid reservoir and a second reservoir, the check valve comprising:
   a pin having a shaft portion attached adjacent to the second reservoir and a closed head portion, the shaft portion having a central channel being positioned to open into the second reservoir, the pin having an outer surface and at least one opening connecting the outer surface of the pin to the central channel; and
   a diaphragm formed of an elastomeric material, the diaphragm being disposed to tightly fit and bias against the outer surface of the pin, the diaphragm sealing around the at least one opening, and being elastically deformable by a predetermined positive pressure to define a pathway into the at least one opening in the outer surface of the pin.

2. The check valve of claim 1 wherein the second reservoir is at sub-atmospheric pressure.

3. The check valve of claim 1 wherein the closed head portion is wider than the shaft portion and the at least one opening in the surface of the pin is disposed in the closed head portion.

4. The check valve of claim 3 wherein the shaft of the pin has a cylindrical shape that defines an outer diameter and the diaphragm has an annular shape that defines an inner diameter approximately equal to the outer diameter of the shaft portion of the pin so that the diaphragm tightly fits the shaft portion of the pin.

5. The check valve of claim 3 wherein the diaphragm biases against the wider head portion of the pin to seal around the at least one opening.

6. The check valve of claim 5 wherein the outer surface of the pin has taper connecting the closed head portion of the pin.

7. The check valve of claim 6 wherein the at least one opening in the surface of the pin is disposed in the tapered portion of the outer surface.

8. The check valve of claim 1 wherein the at least one opening is in the shaft portion of the pin.

9. The check valve of claim 8 wherein the pin has a tubular shape that defines an outer diameter.

10. The check valve of claim 9 wherein the diaphragm has a substantially tubular shape that defines an inner diameter approximately equal to the outer diameter of the pin so that the diaphragm tightly fits against the pin and seals the at least one opening.

11. The check valve of claim 1 wherein the pin has a plurality of openings that connect the outer surface to the central channel.

12. The check valve of claim 1 wherein a portion of the diaphragm does not contact the pin, and the portion has a plurality of back-flow openings so that fluid may flow from a first side of the diaphragm to a second side of the diaphragm.

13. A method for controlling the flow between a first fluid reservoir and a second fluid reservoir, the method comprising:
   securing an open end of a pin adjacent to the first fluid reservoir and a closed end of the pin adjacent the second fluid reservoir, the pin having a shaft portion with a central channel therein connecting the open end of the pin to the second fluid reservoir through at least one opening in the outer surface of the pin;
   fitting a diaphragm tightly against the pin, the diaphragm sealing around the opening in the outer surface of the pin; and
   elevating a fluid pressure adjacent the closed end of the pin to cause deformation of the diaphragm adjacent the opening in the outer surface of the pin to allow fluid flow into the opening in the pin, through the central channel and into the second fluid reservoir.

14. The method of claim 13 wherein the second fluid reservoir is at sub-atmospheric pressure.

15. The method of claim 13 wherein the pin has a plurality of openings in the outer surface.

16. The method of claim 13 wherein the closed end is wider than the shaft portion and the opening in the surface of the pin is disposed in the closed end.

17. The method of claim 16 wherein the diaphragm biases against the wider closed end of the pin to seal around the opening.

18. The method of claim 13 wherein the shaft portion of the pin has a cylindrical shape that defines an outer diameter and the diaphragm has an annular shape that defines an inner diameter approximately equal to the outer diameter of the shaft portion of the pin so that the diaphragm tightly fits the shaft portion of the pin.

19. The method of claim 13 wherein the outer surface of the pin tapers from the closed end of the pin to the shaft portion of the pin to create a tapered portion of the outer surface.

20. The method of claim 19 wherein the opening in the surface of the pin is disposed in the tapered portion of the outer surface.

21. The method of claim 13 wherein the opening is in the shaft portion of the pin.

22. The method of claim 13 wherein the pin has a tubular shape that defines an outer diameter.

23. The method of claim 13 wherein the diaphragm has a substantially tubular shape that defines an inner diameter approximately equal to the outer diameter of the pin so that the diaphragm tightly fits against the pin and seals the opening.

* * * * *